(12) United States Patent
Anderson

(10) Patent No.: US 9,805,112 B2
(45) Date of Patent: Oct. 31, 2017

(54) METHOD AND STRUCTURE FOR MANAGING MULTIPLE ELECTRONIC FORMS AND THEIR RECORDS USING A STATIC DATABASE

(71) Applicant: EVADO HOLDINGS PTY LTD, Melbourne (AU)

(72) Inventor: Ross Anderson, North Melbourne (AU)

(73) Assignee: EVADO HOLDINGS PTY LTD, Melbourne (AU)

( * ) Notice: Subject to any disclaimer, the term of this patent is extended or adjusted under 35 U.S.C. 154(b) by 240 days.

(21) Appl. No.: 14/359,115

(22) PCT Filed: Oct. 16, 2012

(86) PCT No.: PCT/AU2012/001252
§ 371 (c)(1),
(2) Date: May 19, 2014

(87) PCT Pub. No.: WO2013/071336
PCT Pub. Date: May 23, 2013

(65) Prior Publication Data
US 2014/0280026 A1  Sep. 18, 2014

(30) Foreign Application Priority Data
Nov. 18, 2011 (AU) ................................ 2011904815

(51) Int. Cl.
*G06F 17/30* (2006.01)
(52) U.S. Cl.
CPC .. *G06F 17/30604* (2013.01); *G06F 17/30292* (2013.01)
(58) Field of Classification Search
CPC ......... G06F 17/30917; G06F 17/30501; G06F 17/30539; G06F 17/30498; G06F 17/30595; G06F 17/30292; G06F 17/30604

USPC ................................ 707/714, 741, 769, 770
See application file for complete search history.

(56) References Cited

U.S. PATENT DOCUMENTS

| | | |
|---|---|---|
| 6,519,601 B1 * | 2/2003 | Bosch |
| 8,442,996 B2 * | 5/2013 | Maim ........................... 707/791 |
| 2007/0016548 A1 * | 1/2007 | Iyer et al. ......................... 707/1 |

FOREIGN PATENT DOCUMENTS

WO  97/44745  11/1997

OTHER PUBLICATIONS

R. G. Ramirez et al., The cost of retrievals in what-if databases, 1991, IEEE, vol. ii, 136-145.*

* cited by examiner

*Primary Examiner* — Jean B Fleurantin
(74) *Attorney, Agent, or Firm* — Mark M. Friedman

(57) ABSTRACT

A relational database for storing data used to populate form records fields, wherein a database table structure stores both fixed and variable form content, for multiple form types by creating tables to store the fixed form content and variable form content. Also described is a method for structuring a relational database, the data content of which is used to populate form fields in forms; the forms structured as fixed data content interspersed with form fields for receipt and display of variable data content; the variable data content derived from primary tables in said relational database; said method comprising creating one or more reference tables which store information about said primary tables thereby to permit tracking of changes to said form fields.

18 Claims, 5 Drawing Sheets

METHOD AND STRUCTURE FOR MANAGING MULTIPLE ELECTRONIC FORMS AND THEIR RECORDS USING A STATIC DATABASE

The present invention relates to database structures and structuring methodology and more particularly but not exclusively to a structure and methodology that permits tracking of changes to data structured in forms.

BACKGROUND OF THE INVENTION

Database and form design are basic components in much of the data being offered and distributed in the art. Of late, simplified approaches to database design the automation of database development and editing and the ability to quickly generate forms for the collection and management of data have become an important aspect of digital data management.

One approach to speed up and simplify the generation of databases and their design is the practise known in the art of designing a form, laying out fields in that form and generating a template for the requirements of the database that is needed behind that design once the form and database go into use. One example of the way this has been done is to generate an XML document that contains the needed field names, types and requirements of a form and using this along with an automation tool to generate the required database to fit the form.

Yet another method as used by the form generator in the Google Documents product is to automate the generation of a database using a simple set of field types and a form format with very limited layout flexibility.

Both of the described methods still use the popular basic database generation methodology of creating tables that contain fields that are of a specific type and that ultimately will contain data related to the fields contained in that table.

The above approaches treat form related data as a hierarchy of information grouped firstly in tables then sub grouped in field names then finally in related data tied to each field name.

These approaches lead to redundancy and inefficiencies when new fields, forms and tables are introduced, or the database is changed over time, More broadly, there are several ways of storing form data, including:
(a) Data Object The form content is stored as data file or object, e.g. XML, Lotus Notes database object. If the form data object is stored in a database the field content needs to be indexed to enable the user to query form content.

This approach can easily handle form layout changes, however the content indexes need to be updated when the new form layout is issued.
(b) Form Table The form content is stored directly in a database table, the table can be form specific, i.e. the table is form specific. Alternatively, the form can be mapped to the larger application data model or schema.

This approach requires changes to the database when the form layout is changed, i.e. to add columns to database tables.

This approach can also it make it difficult to query a collection of records that have different form layouts. (c) Transactional storage: e.g. Oracle forms The form fields are mapped as database update transactions, where all field values updates are executed as atomic database transactions, the method is derived from the financial and banking sectors.

While this approach provides a method of extending or handling changes to form layouts, by changing field to data transaction mapping. The mapping changes need to be done by an IT specialist, or programmer This approach also requires the form to interact with the database when each field is updated.

This approach can also it make it difficult to query a collection of records that have different form layouts.

BRIEF SUMMARY OF THE INVENTION

Embodiment of the invention are directed to relational database executable on a computer, the computer storing data used to populate form records fields, wherein a database table structure stores both fixed and variable form content for multiple form types by creating tables to store the fixed form content and variable form content; and the database table structure permits the fixed form content to be updated by the computer to create new versions of a specific form and generate version specific variable form content for each form type in the database; and the fixed form content and variable form content are stored in a relational database on the computer and all form content can be directly queried with queries which can return result sets containing form content for one or more form types and for multiple versions of each form type in the query, and the keys are stored and used to link data between forms and are generated by an application in communication with the database via the internet and the application resides on a digital device remote from the database.

PRIOR ART DISCUSSION

A practical technical problem arises when forms evolve over time. It is not uncommon for fields to be added to a form whilst other fields are taken away. Current database systems
(particularly, but not exclusively, those intended to be accessible via and manipulated within a web interface) have technical
difficulty in allowing users access to earlier versions of forms and the data which may have resided in those earlier versions. They also have difficulty in allowing visualisation of current versions and earlier versions of forms together or as an integrated whole.

The problem is compounded where datasets range over relatively long timelines—for example, 15 years or more in the case of medical records systems. The typical problem is how to allow data which is entered into form structures and presented in form structures to be versioned over time but without losing data integrity. In its simplest form the problem is how to be able to version data collection forms whilst maintaining the integrity of data collected with each version and then to make data across all the different versions easily accessible, ideally via a web interface which is accessible remotely from the database itself.

There is much prior art directed to database design generally and form design more specifically in a database context. Patent literature of the 1990s includes patents owned by Adobe Systems (some of which were acquired from Form Flow and from Jet Form) relating to form design. As Web forms have evolved these early patents have become of less relevance.

U.S. Pat. No. 7,673,228 assigned to Microsoft Corp describes a methodology for amending forms accessed on networked devices without altering the network form's data instance maintained at the server thereby reducing the load on the network and on the server. As such this patent does not address itself to the technical problem described above nor provide a technical implementation of the type described below.

U.S. Pat. No. 7,275,216 also assigned to Microsoft Corporation discloses a hierarchical schema for building electronic forms and describes a user interface. Again, this schema does not address itself to the technical problem described above nor provide a technical solution of the type described below.

US 2010/0306638 also assigned to Microsoft Corporation discloses an object template system that allows an administrator of an IT management application to define templates that provide a streamlined mechanism for pre-populating IT objects with common values. All forms are driven from the database server. The problem remains that you will need to change the database schema in order to change the forms. The problem of tracking versions is not addressed.

US application 2003/019579 provides a database driven form manager for building and modifying a form for use in an Internet, intranet or extranet environment. This patent application is directed to form layout rather than the indexing of the forms. Hence it is not clear that the form versions can be tracked utilising this technology, much less tracked efficiently as forms change and particularly where there are very large datasets spread over many years.

Embodiments of the disclosed invention are designed to address or ameliorate these issues or at least provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

DEFINITIONS AND TERMINOLOGY

Form object contains the fixed form content, e.g. form ID, form title.

Form field object contains the fixed form field content, e.g. form field identifier, form field name, form field data type.

Record object contains form variable form content for a specific form object, e.g. Record ID, record date, record author.

Record value object contains record value for a specific form field object.

Form table contains instances of the form objects.

Form Field table contains instances of the form field objects.

Record table contains instances of record objects.

Record Values table contains instances of record value objects.

BRIEF DESCRIPTION OF INVENTION

Accordingly, in one broad form of the invention, there is provided a relational database for storing data used to populate form records fields, wherein a database table structure stores both fixed and variable form content for multiple form types by creating tables to store the fixed form content and variable form content.

Preferably keys are stored and used to link data between forms.

Preferably primary keys are generated by an application in communication with the database Preferably communication between the application and the database is via the internet.

Preferably the application resides on a digital device remote from the database

Preferably said database structure permits the fixed form content to be updated to create new versions of a specific form and generate version specific variable form content for each form type in the database.

Preferably said database enables the user to query and view fixed and variable form content for all versions of a specific form type.

Preferably the table structure allows the database to store an unlimited number of different form types where each form type can have an unlimited number of fields and each form type can be versioned as many times as necessary to meet changing business requirements.

Preferably each version of each form type can have an unlimited number of instances of form content or form record content.

Preferably the fixed form content and variable form content is stored in a relational database and wherein all form content can be directly queried with queries which can return result sets containing form content for one or more form types and for multiple versions of each form type in the query.

Preferably the information about the tables includes fixed content and form fields can be changed over time and where each change is a new instance in the database thereby permitting a specific form type to be changed over time and allowing new variable form data to be linked to a specific version of the form.

Preferably the tables include fixed form content tables; the fixed form content tables including one or more of:
(a) a form properties table;
(b) a form field properties table.

Preferably the tables include variable form content tables; the variable form content tables including one or more of:
(a) a form content/record table;
(b) a form field content table.

Preferably the form properties table includes a form properties table primary key and wherein tables are joined using the form properties table primary key in a one-to-many relationship with the form field property table thereby to provide a permanent link between the form properties table and the form field properties table.

Preferably the form content table includes a form content table primary key and wherein tables are joined using the form content table primary key in a one-to-many relationship with the form field content table thereby to provide a permanent link between the form content table and form field content table.

Preferably the form content table and the form properties content table are joined using the form properties table primary key in a one-to-many relationship thereby to provide a permanent link between the form properties table and the form content table.

Preferably the form field properties table and the form field content table are joined using the form field properties table primary key in a one-to-many relationship thereby to provide a permanent link between the form field properties table and the form field content table.

Preferably each new form version will have a new primary key and its fields will have new primary identifiers thereby linking the form field properties, form content and form field content to the new version of the form and thereby separating the form content and form field content of each version of a specific form and of any other form types stored in the database.

Preferably pivot queries can be used to create flat files of form field content for integration with other IT systems.

In yet a further broad form of the invention there is provided a system for storing versioned data/said system including
(a) a relational database for storing data used to populate form records fields wherein a database table structure stores both fixed and variable form content for multiple form types by creating tables to store the fixed form content and variable form content;
(b) a server coupled to the database; a plurality of user devices connected to the server and the database via a network; and
(c) a user interface provided at each user device for allowing a user to access said data stored on said relational database.

Preferably the system incorporates the relational database as described above.

In yet a further broad form of the invention there is provided a method for structuring a relational database, the data content of which is used to populate form fields in forms; the forms structured as fixed data content interspersed with form fields for receipt and display of variable data content; the variable data content derived from primary tables in said
relational database; said method comprising creating one or more reference tables which store information about said primary tables thereby to permit tracking of changes to said form fields.

Preferably the method includes the step of storing keys and utilising the keys to link data between forms.

Preferably primary keys are generated by an application in communication with the database Preferably communication between the application and the database is via the internet.

Preferably the application resides on a digital device remote from the database

Preferably a database table structure stores both fixed and variable form content for multiple form types by creating tables to store the fixed form content and variable form content.

Preferably said database structure permits the fixed form content to be updated to create new versions of a specific form and generate version specific variable form content for each form type in the database.

Preferably said database enables the user to query and view fixed and variable form content for all versions of a specific form type.

Preferably said information about said primary tables includes one or more of information about primary table field structure and about primary table field content as a function of time or a function of form version.

Preferably said reference tables comprise form design tables including one or more of
(a) a form layout properties table
(b) a form field properties table Preferably said reference tables comprise form content tables including one or more of a content/record properties table and a form content table.

Preferably the form content table and the form field content table are joined using the form content table global unique identifier in a one-to-many relationship.

Preferably the form field properties table is joined to the form field content table using the form field properties global unique identifier in a one-to-many relationship.

Preferably the relationships between the form layout and the form content and form field properties and the form field content are created when the form content is created.

Preferably the relationships are never updated during the life of the relational database thereby creating a permanent relationship between the layout and the content for the life of the relational database (which remains unchanged even if form versions change).

Preferably each new form version will have a new global unique identifier and its fields will each have a new global unique identifier.

In yet a further broad form there is provided a system for storing versioned data; said system including a relational database for storing data used to populate form records fields wherein a database table structure stores both fixed and variable form content for multiple form types by creating tables to store the fixed form content and variable form content; a server coupled to the database; a plurality of user devices connected to the server and the database via a network; and a user interface provided at each user device for allowing a user to access said data stored on said relational database.

Preferably said server implements the method steps described above.

In yet a further broad form there is provided a digital communications device hosting an application; the application generating at least a first primary key; the primary key stored in the relational database described above; the at least one key utilised to link data between the forms stored on the database.

Preferably the digital communications device described above is connected with the database via the internet.

Preferably the data is transmitted in a series of data packets.

Preferably the data packets include a header portion which contains address information and a—data portion which includes data.

In yet a further broad form there is provided a digital communications device as described above in communication with the database as described above.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Summary

Figure 1:
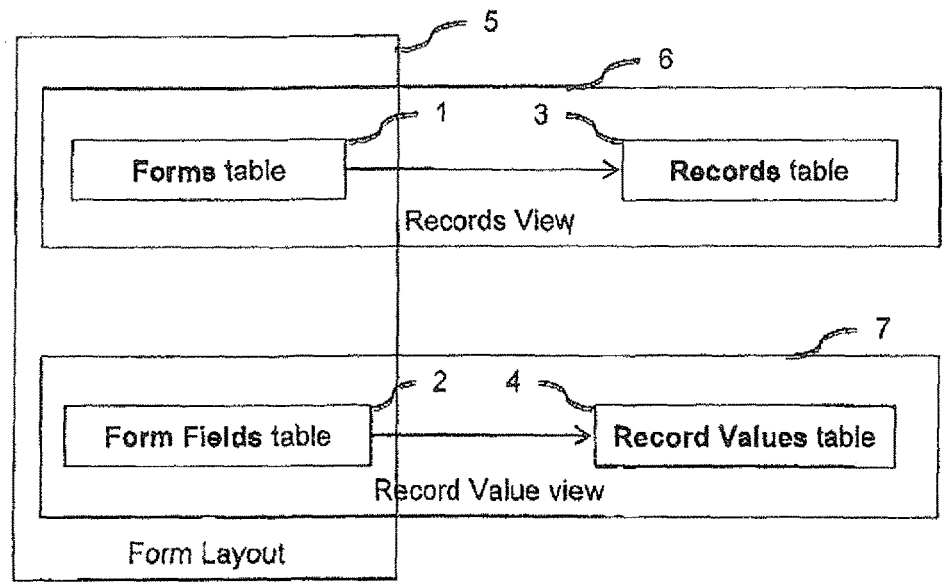
FIG. 1 outlines the relationships between the form tables in accordance with an embodiment of the invention.

In summary, and with reference to FIG. 1, a method of form and record management in accordance with a first preferred embodiment broadly comprises using four relational database tables to store the form design and form record content.

The form design is stored in two database tables:
(a) One table is used to store the form design properties (the Forms table 1), e.g. identifier, title, version and release approvals.
(b) One table is used to store the form field properties (the Form Fields table 2), e.g. field identifier, field title, data type, order on the form etc.

The Forms table 1 and Form Fields table 2 are joined with a one-to-many relationship between the tables. This allows the form to have an unlimited number of form fields.

A form state property controls when a form layout is made available for use to create a record and a form version property indicates the currently issued version of the form.

Records information is stored in two database tables:
(a) A table to store the form record content (Records table 3), e.g. completion state, relevant business references or identifiers, record approval signoffs and workflow states.
(b) A table store the form record field content for the record (Record Values table 4).

The Forms table 1 and the Records table 3 have a one-to-many relationship this allows multiple records to be created from the one form design.

The Records table 3 and the Record Values table 4 are joined with a one-to-many relationship. This allows the record to have multiple form field values.

The Form Fields table 2 and the Record Values table 4 are joined with a one-to-many relationship. This allows a specific form field to have multiple record values.

The relationships are generated when the form and record content is inserted into the database. Once created these relationships are never updated, thereby creating a permanent relationship between the form layout and the form content (or record) for all time that will be unchanged as the form versions change.

Executing a select and insert query can copy a form layout. The new instance of the form can then be updated and issued as a new version of the form. All Records created with the new version will be bound to the new version of the form, while records created using the previous version will be bound that version of the form. This provides a method for version forms over time without adversely affecting the data created using the pervious version of any form.

Because all of the form, field properties and content are stored in separate database tables. It is possible to define an unlimited number of form layouts and create an unlimited number of records from each form layout without having to change the database structure.

By adding relevant indexes and identifiers to the Records table 3 a form record can be associated with multiple business systems. This enables form management environment to be used for the collection of a wide variety for form records that may be associated with multiple parts of a business or enterprise.

While not outlined in this specification, this form management environment could be integrated with multiple user interfaces and web services or other business systems. Similarly is would also be possible to automatically generate form record from external business systems.

In addition, the same method for associating form to fields and records to record values could also be extended to handling form sections or standard operating procedures steps.

In a relational database implementation the Forms, Form Fields, Records and Record Values are stored in separate tables. The form field layout and properties are stored in one set of tables and the Records and field values are stored in another set of tables.

Database Entities

FIG. 1 outlines the relationships between the form tables.

Form Design Structure

The form design is stored in two tables.

The Forms table 1 contains the form's object. Depending upon the implementation the form object, could include design or layout content. A typical Forms table 1 would consist of:
(a) Form primary key, e.g. GUID;
(b) Form identifier, e.g. 10 character abbreviation for the form;
(a) Form title;
(d) Form issue status;
(e) Form version identifier;
(f) Other content relevant to the Records implementation, e.g. form workflow;
(g) Form layout properties (optional);
(h) XML objects to extend the form object properties (optional). These properties could alternatively be stored as extended property tables directly associated with the form object.

The Form Fields table 2 contains the form field objects. Depending upon the implementation the form field object could include field design content or field layout properties. A typical Form Fields table 2 would consists of:
(a) Form field primary key, e.g. GUID;
(b) Form foreign key, e.g. the form's primary key. This link defines the form fields that are associated with a specific form instance in Forms table 1;
(c) Form field identifier, e.g. 10 character abbreviation for the form field;
(d) Form field title;
(e) Form field data type indicator, to determine the form field validation process;
(f) Form field order, defining the order of the form fields on the form;
(g) Other form fields that may be relevant for a form implementation e.g. form field instructions, form field mandatory indicator;
(h) Form field validation rules;
(i) Form field layout properties (optional);
(j) XML objects to extend the form field object properties (optional). These properties could alternatively be stored as extended property tables directly associated with the form field object.

The form field objects contained in Form Fields table 2 are linked to the form objects contained in Forms table 1 using the form object's primary key.

Depending upon the implementation is may be necessary to extend the Forms table 1 and Form Fields tables 2 to provide storage for additional information, e.g. Validation rules and validation values. For the purposes of this specification, these additional tables are considered to be sub-tables to the Forms tables 1 or Form Fields tables 2 and are collectively referred to by their parent table. That is, sub-tables directly associated with the Forms table 1 are considered part of the Forms table 1. Sub-tables directly associated with the Form Fields table 2 are considered part of the Form Fields table 2 object.

Form Record Structure

A form record content is stored on two tables.

The Records table 3 contains the record objects. Depending upon the implementation record objects could be restricted to just record approvals, or include form workflow process logs. A typical Records table 3 would consist of:
(a) Records primary key, e.g. GUID;
(b) Form foreign key, e.g. the form's primary key. To retrieve the form design associated with the form record in Forms table 1;
(c) Records identifier, typically automatically generated;
(d) Date the record was generated and completed;
(e) Records status;
(f) Signoff history;
(g) Cross-reference fields to other parts of the business process;
(h) Other content relevant to the Records implementation, e.g. form workflow status and history; (i) XML objects to extend the record object properties (optional). These properties could alternatively be stored as extended property tables directly associated with the record object.

The Record Values table 4 contains the record field objects. Depending upon the implementation the record field objects could be restricted to just form field value or include status and annotation content. A typical Record Fields 4 table would consist of:
(a) Record field object's primary key, e.g. GUID;
(b) Record object foreign key to link the field value with the relevant form record in the Records table 3, e.g. the form record's primary key;
(c) Form Field foreign key to the form field property record, e.g. Form Field primary key. This link defines the record value to the relevant form field properties in Form Fields table 2;
(d) Record field value;
(e) Other field that may be relevant for a form implementation e.g. value annotation or comments, value status;
(f) XML objects to extend the record value object properties (optional). These properties could alternatively be stored as extended property tables directly associated with the record value object.

The record objects contained in Records table 3 are linked to the form objects contained in Forms table 1 using the form object's primary key to link the record objects to the relevant form object in Forms table 1.

The record field objects contained in Record Values table 4 are linked to the form field objects contained in Form Fields table 2 using form field object's primary key to link the record field object to the relevant form field object Form Fields table 2.

The record value objects contained in Record Values table 4 are linked to the record objects contained in Records table 3 using the record object's primary key to relevant record object in Records table 3.

Depending upon the implementation, it may be necessary to extend the Records table 3 and Record Values table 4 to provide storage for additional information, e.g. multiple field values. For the purposes of this specification, these additional tables are considered to be sub-tables to the Records table 3 or Record Values table 4, and are collectively referred to by their parent table. That is, sub-tables directly associated with the Records table 3 are considered part of the Records table 3 object, and sub-tables directly associated with the Record Values table 4 are considered part of the Record Values table 4 object.

Database Views

To facilitate the creation and management of the form design, record, field object and record value content is retrieved using views or queries. One view is used to retrieve record content while the other is used to retrieve form record field content.

Joining together the Forms table 1 and Records table 2 tables together using the form's primary key creates the Records View 6. Linking these tables creates the form record header content view. The result set from this query provides the business and user interface layer with both the form design and record properties in a single object.

Joining together the Form Fields table 2 and Record Values table 4 together using the form field's primary key creates the Record Value View 7. Linking these, tables creates form record field content view. The result set from this query provides the business and user layer with a list of the form field properties and values for a specific form record.

It should be noted that one method of implementation, the memory instance of the Records View 6 content could be implemented as a single object or class. Similarly, the Record Value View 7 content can be implemented as a single object of class. This can result in a single form object or class containing:
(a) Form layout properties
(b) Records properties
(c) List of form field objects containing:
(i) Form Fields
(ii) Form field value content.

Form Design Process

The form design process consists of saving the form design properties into the Forms table 1 and saving the form's field properties into the Form Fields table 2.

The process for creating a form has the following steps:

In practice the form and field unique identifier generation is done within the form application. A user enters form property data into the form object and the form object's unique identifier (database primary key), e.g. GUID, is generated prior saving the new form object to the forms table 1. A user enters form field property data into the form field object and the form field object's, foreign key to the form object is set and for field object's unique identifier (database primary key), e.g. GUID. is generated prior saving the new form object to the forms table 2.

The form and form field objects can be retrieved at any time using the form object primary key. The form and form field objects can then be passed to the user interface to display and update as is appropriate.

Issuing a Form Layout

Form object has a minimum of three operational states:
(a) Draft or preparation state: in this state, the form is being created or updated and is not used to create form content.
(b) Issued or operational state: in this state, the form and form field objects are used to create new instances of form field content or form records.

(c) Withdrawn or superseded state: in this state, the form and field objects are not used to create new instances of form field content or form records, However, it remains linked to the form.

As stated earlier, all forms are versioned, and each version is a new instance of both the form design form field properties in the database. When complete, the updated form replaces the currently issued form design and is used to create new form records.

The form issue process consists of the following steps j n

Form records can only be generated once a form has been issued. By separating the issued from the draft form it is possible to have a version of an issued form in use, while the next version is being updated.

Revising a Form Layout

As stated earlier, all forms are versioned, and each version is a new instance of both the form design form field properties in the database. When complete, the updated form replaces the currently issued form design and is used to create new form records.

The form revision process consists of the following steps:

As all forms objects and form fields property objects are held as database objects, a new instance of a form and form field objects can be creates using several select and insert queries.

When the new version of the form has been issued, all records with that version will be permanently bound to that version.

Record Creation Process

The record creation process consists of the following steps.

In practice the record primary key generation is done within the form record application. As part of the record generation process requires the generated record to be retrieved from the database after it creation. To do this requires the application to have a known identifier. By generating the objects a unique identifier (primary key), e.g. GUID, prior to generating the record object, provides the form record application with a unique identifier to the generated record object in the database.

Using the Forms primary key to bind the Records object to the Forms objects results in Records being permanently bound to a specific version of the form. When a new version of a form is issued, all records created with that form version will be bound to that form version and inherit the content or fields associated with that version of the form.

The creation of a form record object in the database can be achieved by executing a number of select and insert queries. One of these queries generates the record's real world identifier, one inserts the form record object in the Records table 3 and one inserts the form record value object in the Record Value 4 table.

The record's identifier or record primary key can be used to retrieve the form record object using Records View 6 and its associated form record field values using Record Value View 7 for display on a user's interface.

Saving form records content consists of updating the record object and record field content into their respective tables in the database.

Direct Query of Form Content

As all form data is stored in database tables, it is possible to directly query all form field values. These queries can retrieve the form field content as a list of form field values or alternatively outputted as a row using a pivot query.

If the form field values are to be directly queried, it is strongly recommended that form revisions do not delete existing fields but rather hide them if they are not in use. This will ensure that all form data from previous form versions are available to direct table queries.

Extending the Method for Form Section or SOP Steps

The method outlined above can be extended to handle other form based data collection and management processes, e.g. SOP status. This can be achieved for the SOP status by adding an additional Form Step table then storing the form SOP step properties in the table and adding an additional Record SOP Status table to collect section or SOP activities and signoffs. These extensions would use the same processes as used for create and manage form fields and record values respectively.

Second Preferred Embodiment

A second preferred embodiment will now be described with reference to FIGS. 3, 4 and 5.

Form Creation Process

In the following example global unique identifiers have been used a database table's primary keys, alternative identifiers can also be used at database table row's primary keys.

The form creation process creates a new form for collecting form data or a business record. At a minimum, this would consist of:

(a) Creating a new form object by:
(i) generating a new GUID as the database object's primary key;
(ii) setting the form state to 'Draft'; and
(iii) inserting a form property object into the Forms table 1.
(b) For each form field in the form:
(i) creating a new form field object;
(ii) generating a new GUID as the form field object's primary key;
(iii) adding the form object's primary key as the foreign key to link the form field object with the form object in Forms table 1; and
(iv) inserting form field/property object into the Form Fields table 2.

Creating a Form, Version

Typically, each form type will have a form identifier that is used to identify a specify form within the database. Typically each form record instance will have a form content and record identifier that is used to identify each instance of form properties. A version identifier is used to identify the different versions of a specific form type and is incremented as the form is changed over time.

At a minimum, the form update process would consist of:
(a) executing a Select and Insert query of the Forms table 1 by:
(i) querying the existing form object from Forms table 1 using its primary key;
(ii) generating a new GUID as the primary key for the new form object;
(iii) setting the form object's status properties to 'Draft';
(iv) incrementing the form object's version property to reflect that a new form version has been created; and
(v) inserting the new form object into the Forms table 1.
(b) adding the form field property objects for the new form field property object by:
(i) executing a select using the existing form property primary key to select the database rows containing its form field properties in Form Fields table 2;
(ii) for each retrieved form field property object:

(1) generating a new GUID as the database object's primary key for the new form field property object in the form field property table;
(2) adding the new form property primary key as the foreign key to link the new form field property object with the new form property object; and
(3) inserting the new form field property object into the Form Fields table 2.

Once the new form property and form field property instances have been created, the new form object and it fields can be updated as needed prior to making the form operational.

Making a Form Operational

When a form's properties, has updated and is ready for use the form needs to set in to an 'Issued' or operational state, to allow users to create form content. This done by changing the form status from 'Draft' (or preparation) state to 'Issued' (or operational) state. Form properties cannot be updated in the 'Issued' state.

The process for setting a form to an 'Issued' or operational state the form comprises:
(a) retrieving the form object of the Forms table 1 by execute a select update the database query to set any issued form objects to a 'Withdrawn' or non-operational state. There can only be one instance of an issued version for each form type.
(b) updating the retrieved form object state to 'Issued' of operational state;
(c) updating the form object in Forms table 1 is set to an operational state.

When creating new record objects, the database selection query must query only the issued or operational instance of any form type. Querying the form by its form identifier for all form property objects that are issued can do this.

Form Record Creation Process

As stated earlier, the form content creation process consists of creating a new record row in the record table and making new form field content instances in the form field content table and linking the appropriately. This consists of:
(a) Executing a select and insert query using the existing form's primary key to select the issued instance the form object from Forms table 1. This is done by:
(i) generating a new GUID as the record object's primary key in Records table 3;
(ii) adding the form object primary key as the foreign key to link the form object in Forms table 1 with the record objects in Records table 3; and
(iii) inserting the new record object into the Records table 3.
(b) Creating the record field objects by:
(i) executing a select and insert using the form object's primary key to select the form field objects from Form Fields table 2; and
(ii) for each retrieved form field object:
(1) generating a new GUID as the record value object's as the primary key in Record Values table 4;
(2) adding the form field object's primary key as the foreign key to link the form field object in Form Fields table 2 with the record value objects in Record Value 4 table;
(3) adding the record object's primary key as the foreign key to link the record value object in Record Values table 4 with the record object in Records table 3; and
(4) inserting the record value objects into Record Value 4 table.

Once this record and record value objects have been inserted into Records table 3 and Record Values table 4, the record object and it associated form record value objects can be retrieved and updated then saved to the database.

The process for linking a record object and record value objects to the form object and form field objects, creates a set of joins that bind these objects together permanently and are independent of new versions of the form that may be created over time.

Figure 2:
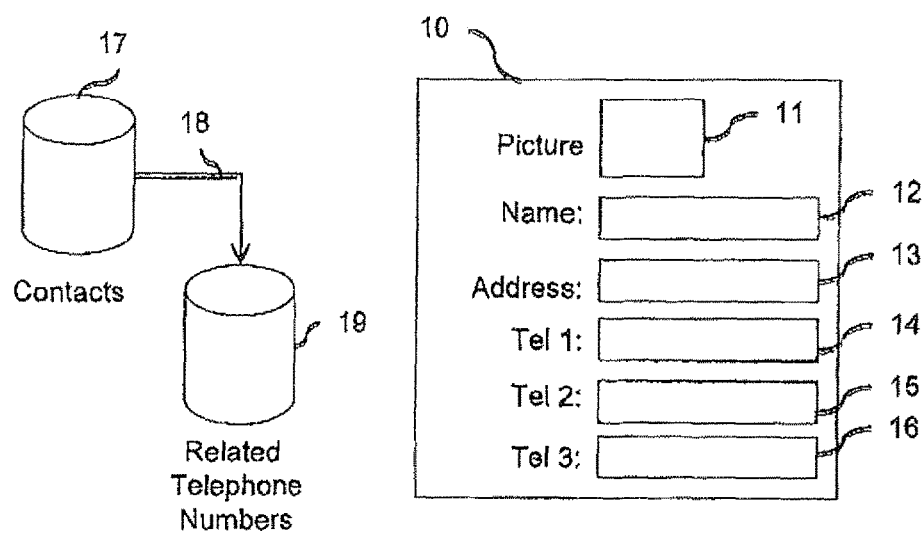
FIG. 2 is a standard database schema and approach (prior art)
Figure 3:
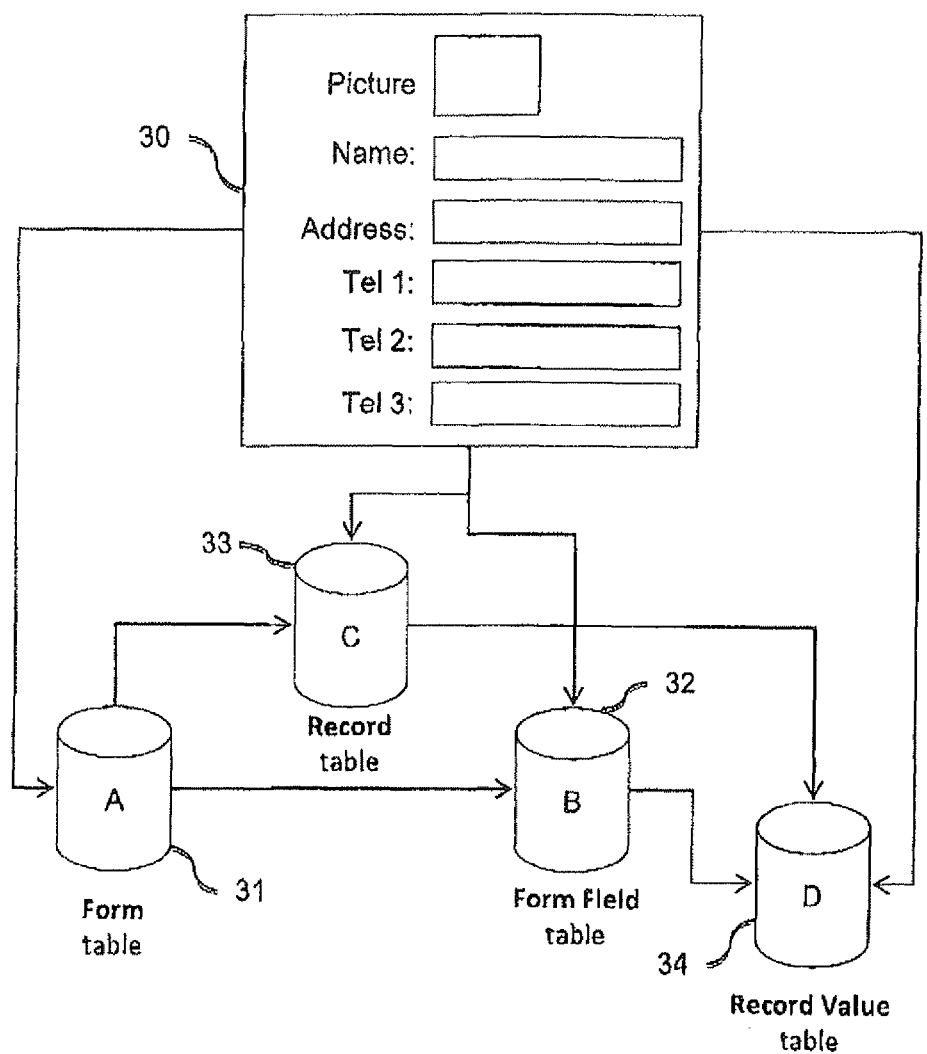
FIG. 3 is a basic example embodiment structure of one embodiment of the present invention.
Figure 4:
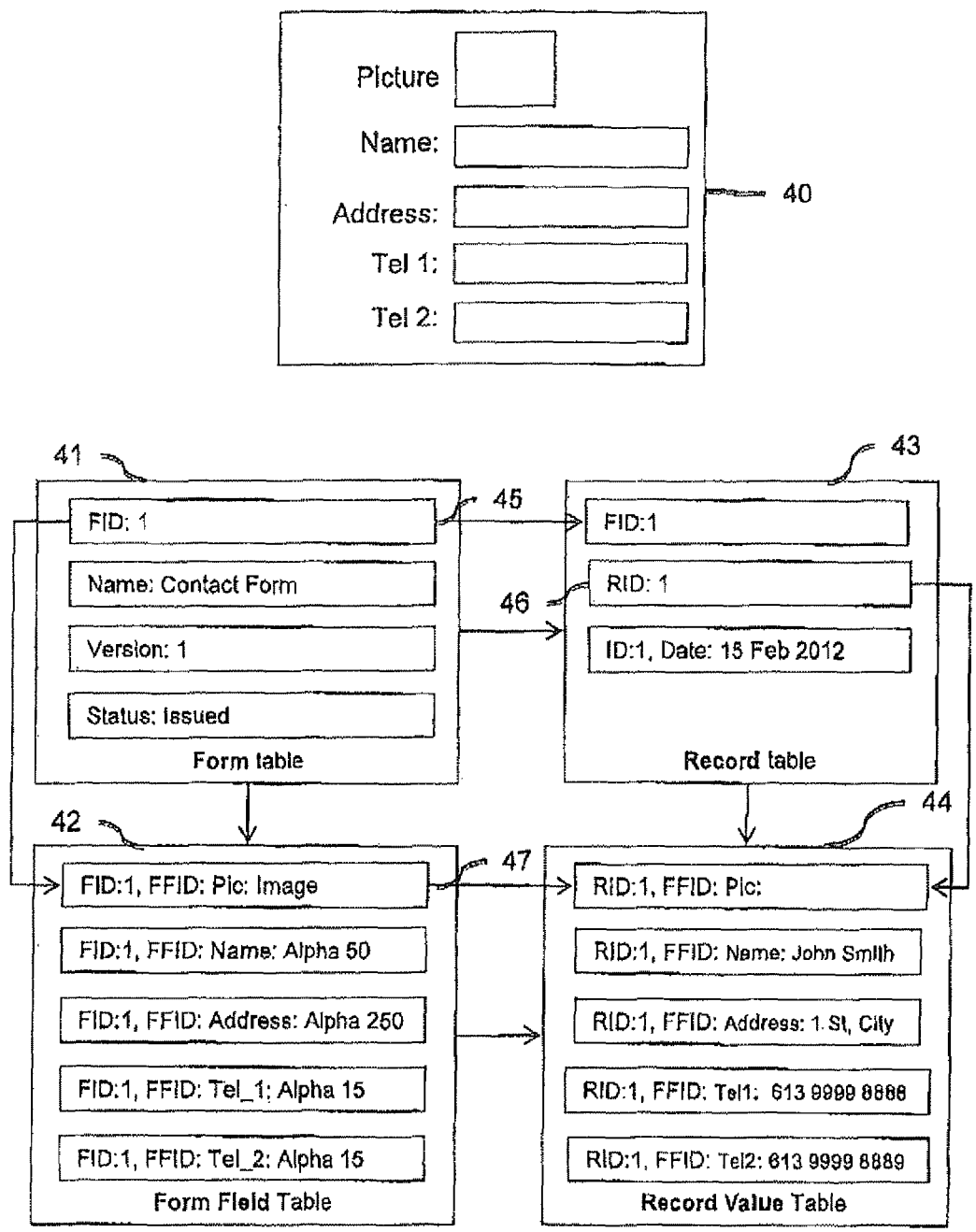
FIG. 4 is an example embodiment including form field examples.

Stated another way and with reference to FIGS. 2, 3 and 4;

FIG. 2 discloses an example of a basic database scheme using a standard approach as known in the aft and is presented for informational purposes and a means of comparison. The figure includes a basic example form 10 with basic fields of information relating to a database of contacts. The form captures information and stores it, In this example the information captured is a contacts picture 11, name 12, address 13 and three telephone numbers related to that contact 14, 15, 16.

The form allows one or more telephone numbers to be associated with a specific contact. In terms of a database design, the standard approach to capturing this information would be to build a table of contacts 17 that would contain multiple fields relating to the same contact 10.

In a typical relational database, a secondary table 19 would be advantageous allowing one or more telephone numbers 14, 15, 16 to be stored 19 in a one-to-many relationship 18 with the main contact table.

This configuration would allow as many telephone numbers 14, 15, 16 as required to be connected to the main contact table 17 in a linked relationship 18.

FIG. 3 shows an example embodiment of the invention using the same basic parameters and data of the existing approach disclosed in FIG. 2 but arranges that information in the new scheme taught by the invention.

In the disclosed approach of FIG. 3, information about the database is arranged in four basic tables. The first A is a table of form properties table 31. This table contains the form properties such as the form identifier, form version and current status, related to the form of information table 30 that is to be captured or displayed. The second table B contains information about field properties, the type of fields they are and any other related information about the field property table 32. The fields can be different types including but not limited to types such as numeric, alphanumeric or binary.

A third table C contains form content related information including but not limited to the form content identifier, author name table 33.

A fourth table D contains the data 34 that is related to the form data instance identifier table 33 and the relevant field name table 32. Each table A, B, C, D contains information connected and related to the form 30 that is used to interface with the user to allow data to be viewed, edited or produced.

The result of this approach to database design is that information is grouped relative to its structural role as a component in a database, rather than to its logical role as part of a set of grouped information.

FIG. 4 further clarifies the application of the example embodiment by showing how fields within the tables described in FIG. 2 can be used to build a database using the scheme taught by the invention.

In FIG. 4, the table of forms table 41 is the equivalent to the table 31 in FIG. 3. The table may include a field that defines an identification number 45 (also termed form identifier or 'FID') that is linked to a specific form 40.

In FIG. 4, the table of forms table 42 is the equivalent to the table 32 in FIG. 3. The table may include a form properties and static form data.

In FIG. 4, the table of form content table 43 is the equivalent to the table 33 in FIG. 3. The table may include form content.

In FIG. 4, the table of form field data table 44 is the equivalent to the table 34 in FIG. 3. The table may include a record value data.

Table 42 contains the form field properties and static form date that could include the form's name, version and/or operational state. The value of FID 45 is used to relate the form content row with the form field properties rows.

Table 43 contains the form field properties for each field on the form, and could include the field name and data type. Value of FID 45 is used to relate the form content row with the form used to collect the form content.

When a new instance of form data is created a new record is added the table 43. The form content identifier or record ID ('RID') 46 is given a new value. Value of FID 45 is used to relate the form content row with the form used to collect the form content.

The form field data rows are linked to the form content row using RID 46 and linked to the respective form field properties using the form field property or form field ID (FFID) 47. This links the field value with the field properties and/or metadata.

The result is that each instance of form field content is linked to the relevant form design, and each of the form's field data are linked to the relevant form field properties.

Third Preferred Embodiment

Figure 5:
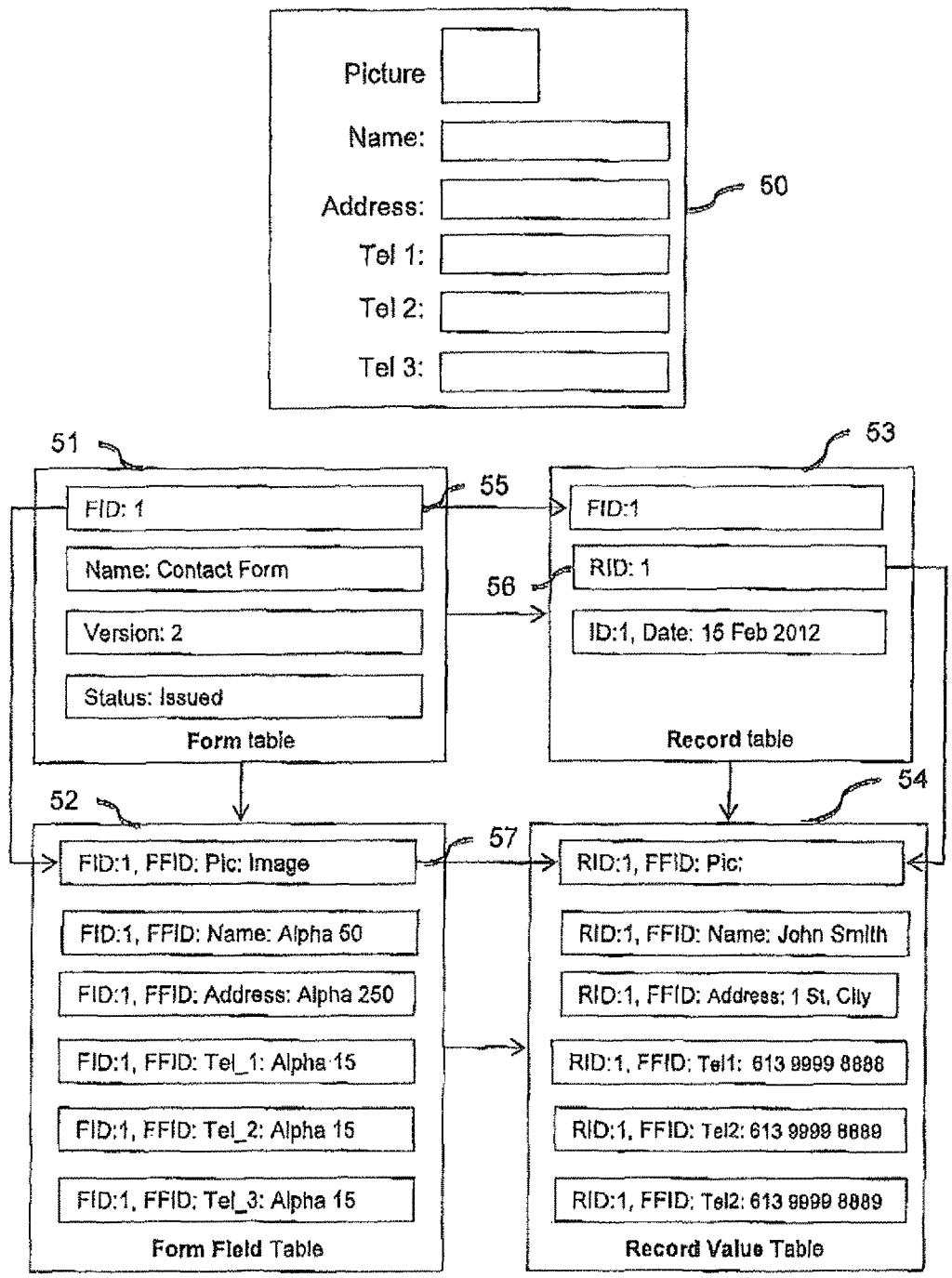
FIG. 5 is an example embodiment including form fields after a revision.

FIGS. 4 and 5 describes an embodiment of the invention where FIG. 4 describes version 1 of the form layout and FIG. 5 describes version 2 of the form layout. FIG. 5 is the same as FIG. 4 but with the addition of the new telephone field.

The following embodiment walks through the process creating a form version 1, adding data and then revising the form layout to create version 2 and adding a new record data. In version 1 the form has the following fields: Picture, Name, Address, Tel 1, Tel 2. In version 2 the form has the following fields: Picture, Name, Address, Tel 1, Tel 2, Tel 3.

The initial form creation process consists of:
(a) Creating a new form object, defining its name as 'Contact Form', setting its version to 1, creating a unique identifier, in this instance, an FID 45, and inserting it into Form table 41;
(b) Adding the 'Pic' field define form field object, defining its name and data type, setting the field foreign key to the form object unique identifier 45 and inserting the form field object into Form Field table 42; (a) Adding the 'Name' field define form field object, defining its name, setting its data type, setting the field foreign key to the form object unique identifier 45 and inserting the form field object into Form Field table 42;
(d) Adding the 'Address' field define form field object, defining its name, setting its data type, setting the field foreign key to the form object unique identifier 45 and inserting the form field object into Form Field table 42;
(e) Adding the 'Tel 1' field define form field object, defining it name, setting its data type, setting the field foreign key to the form object unique identifier 45 and inserting the form field object into Form Field table 42;
(f) Adding the 'Tel 2' field define form field object, defining its name, setting its data type, setting the field foreign key to the form object unique identifier 45 and inserting the form field object into Form Field table 42.

(g) (after all of the fields have been defined) Issuing the form, by retrieving object, setting its status to Issued and updating its value in Form table 41.

Once the 'Contact Form' has been issued contact record objects can be generated. This is done by:
(a) Retrieving the issued version of 'Contact Form' from Forms table 41;
(b) Creating a new record object instance, setting it unique identifier, setting is form foreign key to the form object's unique identifier and—inserting the record object in to Records table 43; and
(c) Querying the '"'Contact Form' objects fields in Form Fields, table 42, to retrieve a collection of form field objects, then iterating through each form field object by:
(i) Creating a new record value object;
(ii) Setting its record foreign key to the record objects unique identifier;
(iii) Setting the form field foreign key to the form field object's unique key; and
(iv) Inserting the record value object into Record Value table 44.

Figure 6:
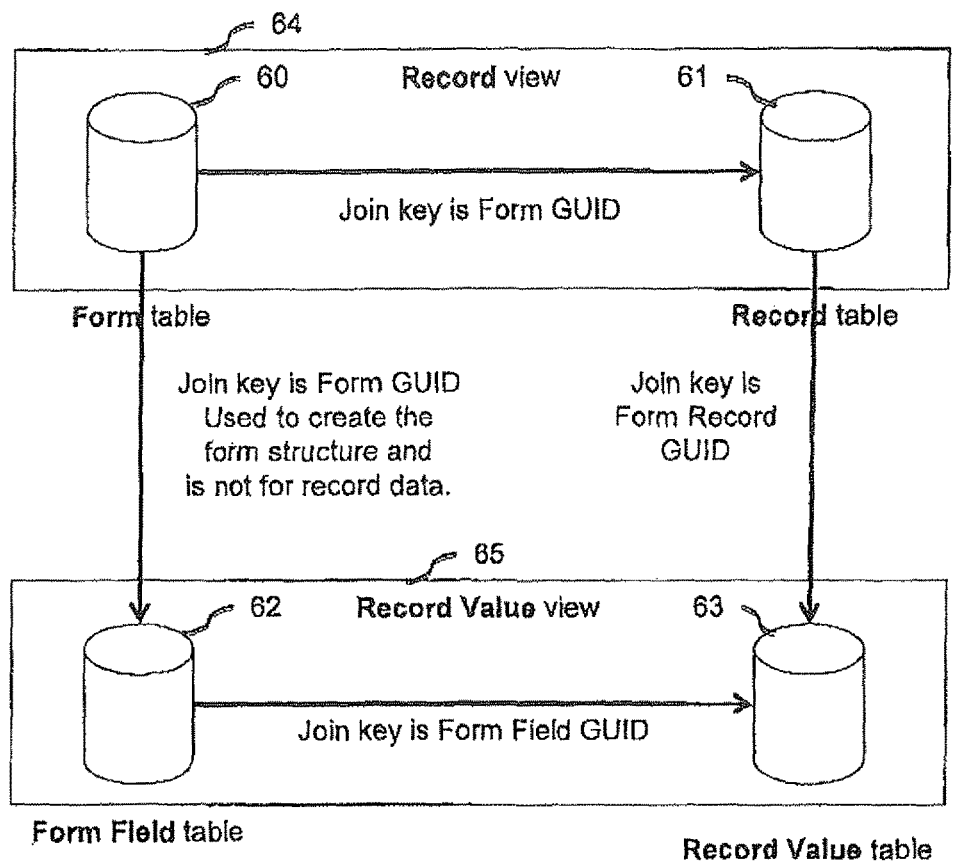
FIG. 6 is a block diagram summarising the functional structure of the system in accordance with a further embodiment.

Once all of the record value objects have been generated, the record object and its record value objects can be retrieved using the views outlines in FIG. 6, where the record object values are set vising the Record View 64 and the list of record value object are retrieved from Record Value View 65 using the record object's unique identifier. The retrieved record object and record value objects can then be used to populate form layout 40. The user can update the 'Contact Form' fields and then save the content back into the database by updating the record values in Record Values table 43.

The 'Contact Form' can be revised to add new fields by process outlined earlier. This process creates a new draft instance of the 'Contact Form'. The new field can be added to the form by:
(a) Retrieving the draft instance of the 'Contact Form' form object;
(b) Adding the 'Tel 3' field define form field object, defining its name, setting its data type, setting the field foreign key to the form object unique identifier 55 and inserting the form field object into Form Field table 52.
(a) (when all of the fields have been defined) Issuing the form, by retrieving object, setting its status to Issued and updating its value in Forms table 51.

Once the new version of the 'Contact Form' has been issued, it can be used to generate new records. All of these records will have an additional 'Tel 3' field, while records generated with version 1 will only have 'Tel 1' and 'Tel 2' fields.

Once the new version of the 'Contact Form' has been issued, contact record objects can be generated. In an SQL database, the record generation process can be performed using 2 insert queries. This is done by:
(a) Retrieving the issued version of 'Contact Form' from Forms table 51;
(b) Creating a new record object instance, setting its unique identifier, setting its form foreign key to the form object's unique identifier, and inserting the record object in to Records table 53.
(c) Querying the 'Contact Form' objects fields in Form Fields table 52 to retrieve a collection of form field objects, then iterating through each form field object by:
(d) Creating a new record value object;
(e) Setting its record foreign key to the record object's unique identifier;

(f) Setting the form field foreign key to the form field object's unique key; and
(g) Inserting the record value object into Record Value table 54.

Once all of the record value objects have been generated, the record object and its record value objects can be retrieved using the views outlines in FIG. 6, where the record object values are set using the Record View 64 and the list of record value object are retrieved from Record Value View 65 using the record object's unique identifier. The retrieved record object and record value objects can then be used to populate form layout 40 or 50. The user can update the 'Contact Form' fields and then save the content back into the database by updating the record values in Record Values table 43.

Figure 7:
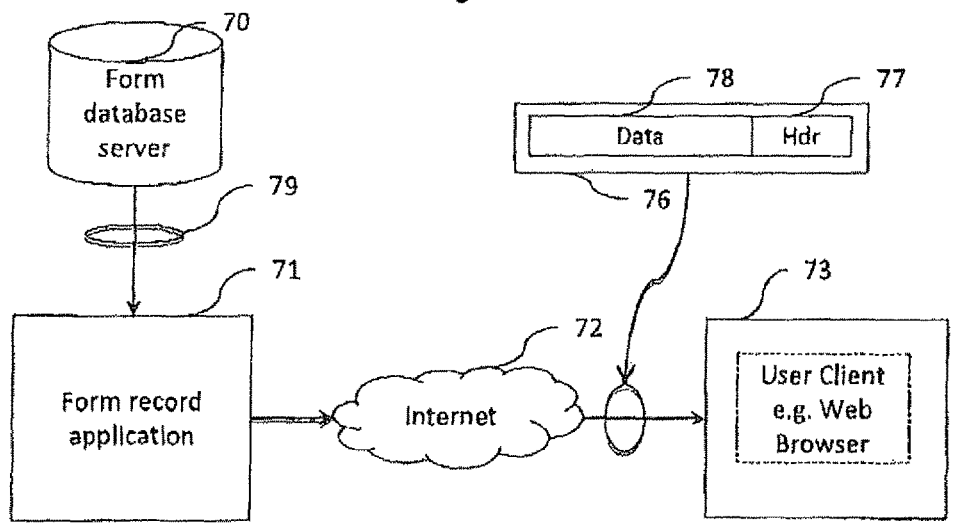
FIG. 7 is a block diagram describing the generic computing architecture used by embodiments of the invention.

FIG. 7 describes a generic implementation of a form application in communication with a user client residing on a remote digital device.

The database server 70 operates the relational database containing Forms table 1, Form Field table 2, Record table 3 and Record Value table 4.

The form record application 71 communicates with the database server using a database query language e.g. SQL, over a link 79, in order to provide a standardised way for the application 71 to query, insert and update Form table 1, Form Field table 2, Record table 3 and Record Value table 4 residing in the database on database server 70.

The form record application 71 manages the generation of form, form field, record and record value objects and manages the user access and user interface to the application 75 via Internet 72. The application 75 residing on remote digital device or computer 73; the user of the device 73 accessing the application from the computer or digital device 73.

Data is communicated by way of data packets 76; each data packet comprising a header 77 and a data portion 78.

In practice, the logical form and record objects are combined into a single form record object containing the properties of both logical objects and the logical form field and record value objects are combined into single a form field value object
containing the properties of both logical objects, The form record object can used as a single application data object containing: the form, record and all of the form field properties and values, by including a list of form field value objects within the form record object.

If the form database is implemented using a SQL database, a number of the processes outlined above can be combined into SQL procedures that are run on the server. This simplifies and
standardises the implementation. For example, revising an existing form can be done using a single SQL procedure, performed in a single database transaction, using two select and insert queries:
(a) Create a new instance of the form object by querying. Form table 41 or Form table 51; and
(b) Create new instances of form field objects linked to the new form object instance by querying Form Field table 42 or Form Field table 52.

Creating a new record can be done using a single SQL procedure, performed in a single database transaction using two select and insert queries.
(a) Create a new instance of the record object by querying. Form table 41 or Form table 51 and inserting the result into Record table 43 or Record table 53.
(b) Create new instances of record value objects linked, to the new form object instance by querying Form Field table 42 or Form Field table 52 and inserting the result into Record Value table 44 or Record Value table 54.

To optimise the database implementation for large-scale data collection, it is preferred to index primary keys and real world references that are used to retrieve form or record objects. E.g. form name or identifier if one is used and all primary keys.

The above-referenced embodiments break the relevant data into four main tables 41, 42, 43, 44 according to their structural role as database components, rather than their logical role. An alternative embodiment may use more than one to an infinite number of tables to achieve the same result.

However, in practice, the four-main-tables embodiment is designed to address most common database applications.

The above-referenced embodiments use a simple example of a contact form and related database. An alternative embodiment may use any application of database or data type.

INDUSTRIAL APPLICABILITY

Broadly, what has been described is a method of using electronic forms to create, issue, revise and collect records data using a static database structure. The method allows users to define multiple electronic forms in a single database structure, and each form can be revised and reissued as necessary. Issued forms can be used to create form records. The records created with each version of a form are bound to that version of the form.

This method can be implemented in any programming language and the form data could be stored in any relational database. The forms, form fields, records and record values can be directly queried in the database.

The implementation outlined in this method utilises a SQL relational database platform. The same functions can also be generated using other non-SQL database platforms.

The invention claimed is:

1. A relational database executable on a computer, the computer storing data used to populate form records fields, wherein a database table structure stores both fixed and variable form content for multiple form types by creating tables to store the fixed form content and variable form content; and wherein said database table structure permits the fixed form content to be updated by said computer to create new versions of a specific form and generate version specific variable form content for each form type in the database; and wherein the fixed form content and variable form content are stored in a relational database on said computer and wherein all form content can be directly queried with queries which can return result sets containing form content for one or more form types and for multiple versions of each form type in the query, and wherein keys are stored and used to link data between forms and are generated by an application in communication with the database via the internet and wherein the application resides on a digital device remote from the database.

2. The relational database of claim 1; said database enabling the user to query and view fixed and variable form content for all versions of a specific form type with a table structure which allows the database to store an unlimited number of different form types where each form type can have an unlimited number of fields and each form type can be versioned as many times as necessary to meet changing business requirements and each version of each form type can have an unlimited number of instances of form content or form record content.

3. The relational database of claim 1 wherein the information about the tables includes fixed content and wherein form fields can be changed over time and where each change is a new instance in the database thereby permitting a specific form type to be changed over time and allowing new variable form data to be linked to a specific version of the form.

4. The relational database of claim 1 wherein the tables include fixed form content tables:
   a. the fixed form content tables including one or more of:
      i. a form properties table;
      ii. a form field properties table;
   b. the variable form content tables including one or more of:
      i. a form content/record table;
      ii. a form field content table.

5. The relational database of claim 4 wherein the form properties table includes a form properties table primary key and wherein tables are joined using the form properties table primary key in a one-to-many relationship with the form field property table thereby to provide a permanent link between the form properties table and the form field properties table and the form content table includes a form content table primary key and wherein tables are joined using the form content table primary key in a one-to-many relationship with the form field content table thereby to provide a permanent link between the form content table and form field content table.

6. The relational database of claim 4 wherein the form content table and the form properties content table are joined using the form properties table primary key in a one-to-many relationship thereby to provide a permanent link between the form properties table and the form content table and the form field properties table and the form field content table are joined using the form field properties table primary key in a one-to-many relationship thereby to provide a permanent link between the form field properties table and the form field content table.

7. The relational database of claim 1 wherein each new form version has a new primary key and its fields have new primary identifiers thereby linking the form field properties, form content and form field content to the new version of the form and thereby separating the form content and form field content of each version of a specific form and of any other form types stored in the database.

8. A method for structuring a relational database executable on a computer, the data content of which is used to populate form fields in forms; the forms structured as fixed data content interspersed with form fields for receipt and display by the computer of variable data content; the variable data content derived from primary tables in said relational database; said method comprising:
   creating one or more reference tables which store information about said primary tables thereby to permit tracking of changes to said form fields; and
   storing keys on the computer and utilising the keys to link data between forms and wherein the primary keys are generated by an application in communication with the database via the internet and wherein the application resides on a digital device remote from the database; and
   wherein said database structure permits the fixed form content to be updated to create new versions of a specific form and generate version specific variable form content for each form type in the database; and
   wherein the fixed form content and variable form content are stored in said relational database and wherein all form content can be directly queried with queries which can return result sets containing form content for one or more form types and for multiple versions of each form type in the query.

9. The method of claim 8 wherein a database table structure stores both fixed and variable form content for multiple form types by creating tables to store the fixed form content and variable form content.

10. The method of claim 8 wherein said database structure permits the fixed form content to be updated to create new versions of a specific form and generate version specific variable form content for each form type in the database enabling the user to query and view fixed and variable form content for all versions of a specific form type.

11. The method of claim 8 wherein said reference tables comprise:
   a. form design tables including one or more of
      i. a form layout properties table
      ii. a form field properties table,
   b. form content tables including one or more of
      i. a content/record properties table
      ii. a form content table.

12. The method of claim 11 wherein the form content table and the form field content table are joined using the form content table global unique identifier in a one to many relationship and the form field properties table is joined to the form field content table using the form field properties global unique identifier in a one-to-many relationship.

13. The method of claim 12 wherein the relationships between the form layout and the form content and form field properties and the form field content are created when the form content is created and once created the relationships are never updated during the life of the relational database thereby creating a permanent relationship between the layout and the content for the life of the relational database.

14. The method of claim 8 wherein each new form version will have a new globally unique identifier and its fields will each have a new globally unique identifier.

15. A system for storing versioned data; said system including
   a. a relational database for storing data used to populate form records fields wherein a database table structure stores both fixed and variable form content for multiple form types by creating tables to store the fixed form content and variable form content;
   b. a server coupled to the database;
   c. a plurality of user devices connected to the server and the database via a network;
   d. a user interface provided at each user device for allowing a user to access said data stored on said relational database; and
   e. wherein said server implements the method for structuring a relational database executable on a computer, the data content of which is used to populate form fields in forms; the forms structured as fixed data content interspersed with form fields for receipt and display by the computer of variable data content; the variable data content derived from primary tables in said relational database; said method comprising:
   creating one or more reference tables which store information about said primary tables thereby to permit tracking of changes to said form fields; and
   storing keys on the computer and utilising the keys to link data between forms and wherein the primary keys are generated by an application in communication with the database via the internet and wherein the application resides on a digital device remote from the database; and wherein said database structure permits the fixed form content to be updated to create new versions of a specific form and generate version specific variable form content for each form type in the database; and wherein the fixed form content and variable form content are stored in said relational database and wherein all form content can be directly queried with queries which can return result sets containing form content for one or more form types and for multiple versions of each form type in the query, with a digital communications device hosting an application.

16. The system of claim 15 wherein the application generates at least a first primary key; the primary key stored in the relational database of claim 1; the at least one key utilised to link data between the forms stored on the database.

17. A digital communications device hosting an application; the application generating at least a first primary key; the primary key stored in the relational database executable on a computer, the computer storing data used to populate form records fields, wherein a database table structure stores both fixed and variable form content for multiple form types by creating tables to store the fixed form content and variable form content; and wherein said database table structure permits the fixed form content to be updated by said computer to create new versions of a specific form and generate version specific variable form content for each form type in the database; and wherein the fixed form content and variable form content are stored in a relational database on said computer and wherein all form content can be directly queried with queries which can return result sets containing form content for one or more form types and for multiple versions of each form type in the query, and wherein keys are stored and used to link data between forms and are generated by an application in communication with the database via the internet and wherein the application resides on a digital device remote from the database, the at least one key utilised to link data between the forms stored on the database.

18. The digital communications device of claim 17 connected with the database via the internet where the data is transmitted in a series of data packets and the data packets include a header portion which contains address information and a data portion which includes data.

* * * * *